United States Patent
Rawal et al.

(10) Patent No.: US 10,884,637 B2
(45) Date of Patent: Jan. 5, 2021

(54) WORKLOAD BASED STORAGE OPTIMIZATION

(71) Applicant: Elastic Flash Inc., Saratoga, CA (US)

(72) Inventors: Darshan Rawal, Fremont, CA (US); Monish Suvarna, Saratoga, CA (US); Arvind Pruthi, Sunnyvale, CA (US)

(73) Assignee: Elastic Flash Inc., Saratoga, CA (US)

( * ) Notice: Subject to any disclaimer, the term of this patent is extended or adjusted under 35 U.S.C. 154(b) by 31 days.

(21) Appl. No.: 16/369,896

(22) Filed: Mar. 29, 2019

(65) Prior Publication Data

US 2019/0303028 A1   Oct. 3, 2019

Related U.S. Application Data

(60) Provisional application No. 62/651,995, filed on Apr. 3, 2018.

(51) Int. Cl.
G06F 3/06 (2006.01)

(52) U.S. Cl.
CPC .......... G06F 3/0631 (2013.01); G06F 3/0604 (2013.01); G06F 3/0653 (2013.01); G06F 3/0673 (2013.01); *G06F 3/0644* (2013.01)

(58) Field of Classification Search
None
See application file for complete search history.

(56) References Cited

U.S. PATENT DOCUMENTS

| | | | | |
|---|---|---|---|---|
| 7,130,967 B2* | 10/2006 | Arimilli | .................. | G06F 9/383 711/137 |
| 7,921,178 B2 | 4/2011 | Haviv | | |
| 8,560,756 B2* | 10/2013 | Yang | .................. | G06F 12/0638 711/101 |
| 2005/0204111 A1* | 9/2005 | Natarajan | ........... | G06F 13/1642 711/167 |
| 2015/0248366 A1 | 9/2015 | Bergsten et al. | | |

OTHER PUBLICATIONS

Feng Chen, et al., "Essential Roles of Exploiting Internal Parallelism of Flash Memory based Solid State Drives in High-Speed Data Processing", IEEE 17th International Symposium on High Performance Computer Architecture, Feb. 12-16, 2011, 12 Pages.

Feng Chen, et al., "Internal Parallelism of Flash Memory-Based Solid-State Drives", ACM Transactions on Storage (TOS), vol. 12 Issue 3, Article No. 13, Jun. 2016, 39 Pages.

(Continued)

*Primary Examiner* — Brian R Peugh
(74) *Attorney, Agent, or Firm* — IP Spring

(57) ABSTRACT

Some implementations relate to storage of data in a storage device with a plurality of chips. In some implementations, a computer-implemented method includes identifying a plurality of software applications that are configured to access data from the storage device, determining a data access pattern for each of the plurality of software applications, and based on the data access pattern, assigning a respective subset of the plurality of storage chips to each software application such that each storage chip is configured for access by a specific software application.

20 Claims, 5 Drawing Sheets

(56) References Cited

OTHER PUBLICATIONS

Hardock, et al., "NoFTL for Real: Databases on Real Native Flash Storage", Databases and Distributed Systems Group TU-Darmstadt, Data Management Lab, Reutlingen University, 2015, 517-520.
Josephson, et al., "DFS: A File System for Virtualized Flash Storage", ACM Transactions on Storage (TOS), vol. 6 Issue 3, Article No. 14, Sep. 2010, 15 Pages.
Klimovic, et al., "Flash Storage Disaggregation", Proceedings of the Eleventh European Conference on Computer Systems Article No. 29, Apr. 18-21, 2016, 15 Pages.
Lee, et al., "Application-Managed Flash", Proceedings of the 14th USENIX Conference on File and Storage Technologies (FAST '16), Santa Clara, CA, USA, Feb. 22-25, 2016, 338-353.
Liu, et al., "MinFlash: A Minimalistic Clustered Flash Array", Proceedings of the 2016 Conference on Design, Automation & Test in Europe, Mar. 14-18, 2016, 1255-1260.
Xiao, Nong, et al. "P3Stor: A parallel, durable flash-based SSD for enterprise-scale storage systems." Science China Information Sciences 54.6 (2011): 1129-1141.
Ouyang, Jian, et al. "SDF: software-defined flash for web-scale internet storage systems." ACM SIGPLAN Notices. vol. 49. No. 4. ACM, 2014.
Trivedi, A. End-to-End Considerations in Unification of High-Performance IO (Doctoral dissertation, ETH Zurich), (2016), 207 Pages.
Zheng Li, et al., "A software-defined fusion storage system for PCM and NAND flash", 2015 IEEE Non-Volatile Memory System and Applications Symposium (NVMSA), Aug. 19-21, 2015, 2 pages.
Zhihao Yao, et al., "Serifos: Workload Consolidation and Load Balancing for SSD Based Cloud Storage Systems", Version 2, arXiv:1512.06432, Dec. 25, 2015.

\* cited by examiner

WORKLOAD BASED STORAGE OPTIMIZATION

CROSS-REFERENCE TO RELATED APPLICATIONS

This application claims priority to U.S. Provisional Patent Application No. 62/651,995, filed Apr. 3, 2018, entitled, "Workload Based Storage Optimization," and which is incorporated by reference herein in its entirety.

BACKGROUND

Storage density of modern solid-state drives (SSDs) is high and is improving at a rapid rate. Further, in certain contexts, e.g., cloud computing, servers that implement virtualization, etc., many software applications may execute on the same server device, e.g., in a multi-tenant mode of operation. In these contexts, many applications may share underlying server hardware, such as processors, memory, storage, network, etc. When server devices are provided with dense, high capacity SSD storage, applications may that execute on the server devices may not be designed in a manner to utilize the available high capacity storage.

Further, current SSDs are not designed to support multi-tenancy, e.g., multiple applications accessing the storage at the same time. When applications issue storage commands, e.g., to read data, write data, etc., to the SSD, such commands are merged, e.g., by the SSD controller. Such mixing of storage commands or requests from multiple applications can lead to non-deterministic behavior from the SSD in terms of latency. For example, such an SSD may not be able to provide a quality of service (QoS) guarantee that a particular storage command will be completed within a given latency parameter.

Implementations described herein were conceived in light of some of these problems.

SUMMARY

Implementations described herein relate to workload based storage optimization. In some implementations, a computer-implemented method to store data in a storage device with a plurality of storage chips includes identifying a plurality of software applications that are configured to access data from the storage device, determining a data access pattern for each of the plurality of software applications, and based on the data access pattern, assigning a respective subset of the plurality of storage chips to each software application such that each storage chip is configured for access by a specific software application.

In some implementations, the plurality of storage chips are organized in channels such that only a subset of storage chips from each channel are accessible concurrently. In some implementations, a first software application of the plurality of software applications is determined to have a high-bandwidth data access pattern. In at least some of these implementations, assigning the subset of storage chips for the first software application comprises assigning at least one chip from each of a plurality of channels.

In some implementations, a first software application of the plurality of software applications is determined to have one or more of a sequential data access pattern or a low-bandwidth data access pattern. In at least some of these implementations, assigning the subset of storage chips for the first software application comprises configuring one or more channels such that each storage chip from the one or more channels is assigned for access by the first software application.

In some implementations, determining the data access pattern is based on historical data access requests. In some implementations, at least one storage chip of the respective subset of the plurality of storage chips for the specific software application is configured for write operations and two or more of the subset of the plurality of storage chips, different from the at least one storage chip, are configured for read operations. In some implementations, at least one storage chip of the respective subset of the plurality of storage chips for the specific software application is simultaneously configured for read operations and write operations.

In some implementations, determining the data access pattern comprises determining a type of request for each data access request and determining a rate of request arrival. In some implementations, determining the data access pattern is performed using a pattern-recognition technique. In some implementations, determining the data access pattern is based on a type of each of the plurality of software applications.

In some implementations, the method includes determining dynamic hardware characteristics of the storage device. In at least some of these implementations, assigning the respective subset of the plurality of storage chips is further based on the dynamic hardware characteristics of the storage device.

Some implementations include a computer-implemented method to store data in a plurality of storage devices, wherein each storage device is configured with a plurality of storage chips arranged in a respective channel. In some implementations, the method includes identifying a plurality of software applications that are configured to access data from the plurality of storage devices, determining a data access pattern for each of the plurality of software applications, and based on the data access pattern, assigning a respective subset of the plurality of storage devices to each software application.

In some implementations, at least one channel in each storage device in the respective subset is configured to include at least one storage chip configured for access by a respective software application. In some implementations, a first software application of the plurality of software applications is determined to have a high-bandwidth data access pattern. In some implementations, assigning the respective subset of the plurality of storage devices to the first software application comprises assigning at least one chip from each of multiple storage devices of the respective subset. In some implementations, at least one chip from each storage device of the plurality of storage devices is included in the subset. In some implementations, at least one chip from each channel of each storage device of the plurality of storage devices is included in the sub set.

Some implementations include a non-transitory computer-readable medium with instructions stored thereon that, when executed by one or more processors, cause the one or more processors to perform operations comprising identifying a plurality of software applications that are configured to access data from a storage device that includes a plurality of storage chips, determining a data access pattern for each of the plurality of software applications, and based on the data access pattern, assigning a respective subset of the plurality of storage chips to each software application such that each storage chip is configured for access by a specific software application. In some implementations, the plurality of storage chips are arranged in a plurality of channels, a first software application of the plurality of software applications is determined to have a high-bandwidth data access pattern, and assigning the subset of storage chips for the first software application comprises assigning at least one chip from each of the plurality of channels.

In some implementations, the plurality of storage chips are arranged in a plurality of channels, a first software application of the plurality of software applications is determined to have one or more of a sequential data access pattern or a low-bandwidth data access pattern, and assigning the subset of storage chips for the first software application comprises configuring one or more channels such that each storage chip from the one or more channels is assigned for access by the first software application.

In some implementations, determining the data access pattern comprises determining a type of request for each data access request and determining a rate of request arrival.

Some implementations include a system comprising one or more processors and a memory coupled to the one or more processors with instructions stored thereon that, when executed by the one or more processors, cause the one or more processors to perform operations that include identifying a plurality of software applications that are configured to access data from a storage device that includes a plurality of storage chips, determining a data access pattern for each of the plurality of software applications, and based on the data access pattern, assigning a respective subset of the plurality of storage chips to each software application such that each storage chip is configured for access by a specific software application.

Some implementations include a non-transitory computer-readable medium with instructions stored thereon that, when executed by one or more processors, cause the one or more processors to perform operations comprising identifying a plurality of software applications that are configured to access data from a plurality of storage devices configured with a plurality of storage chips arranged in a respective storage channel, determining a data access pattern for each of the plurality of software applications, and based on the data access pattern, assigning a respective subset of the plurality of storage devices to each software application.

Some implementations include a system comprising one or more processors, and a memory coupled to the one or more processors with instructions stored thereon that, when executed by the one or more processors, cause the one or more processors to perform operations comprising identifying a plurality of software applications that are configured to access data from a plurality of storage devices configured with a plurality of storage chips arranged in a respective storage channel, determining a data access pattern for each of the plurality of software applications, and based on the data access pattern, assigning a respective subset of the plurality of storage devices to each software application.

DETAILED DESCRIPTION

Modern SSDs are built on a parallel architecture. For example, an SSD has multiple, independent storage channels and multiple chips (e.g., flash memory chips) on each channel. However, because the SSD controller, e.g., that implements firmware (e.g., Flash Translation Layer or FTL) mixes incoming storage commands (e.g., which may be from multiple different applications) into a single stream, SSDs are not able to advantageously utilize the parallel architecture to provide QoS guarantees.

Figure 1:
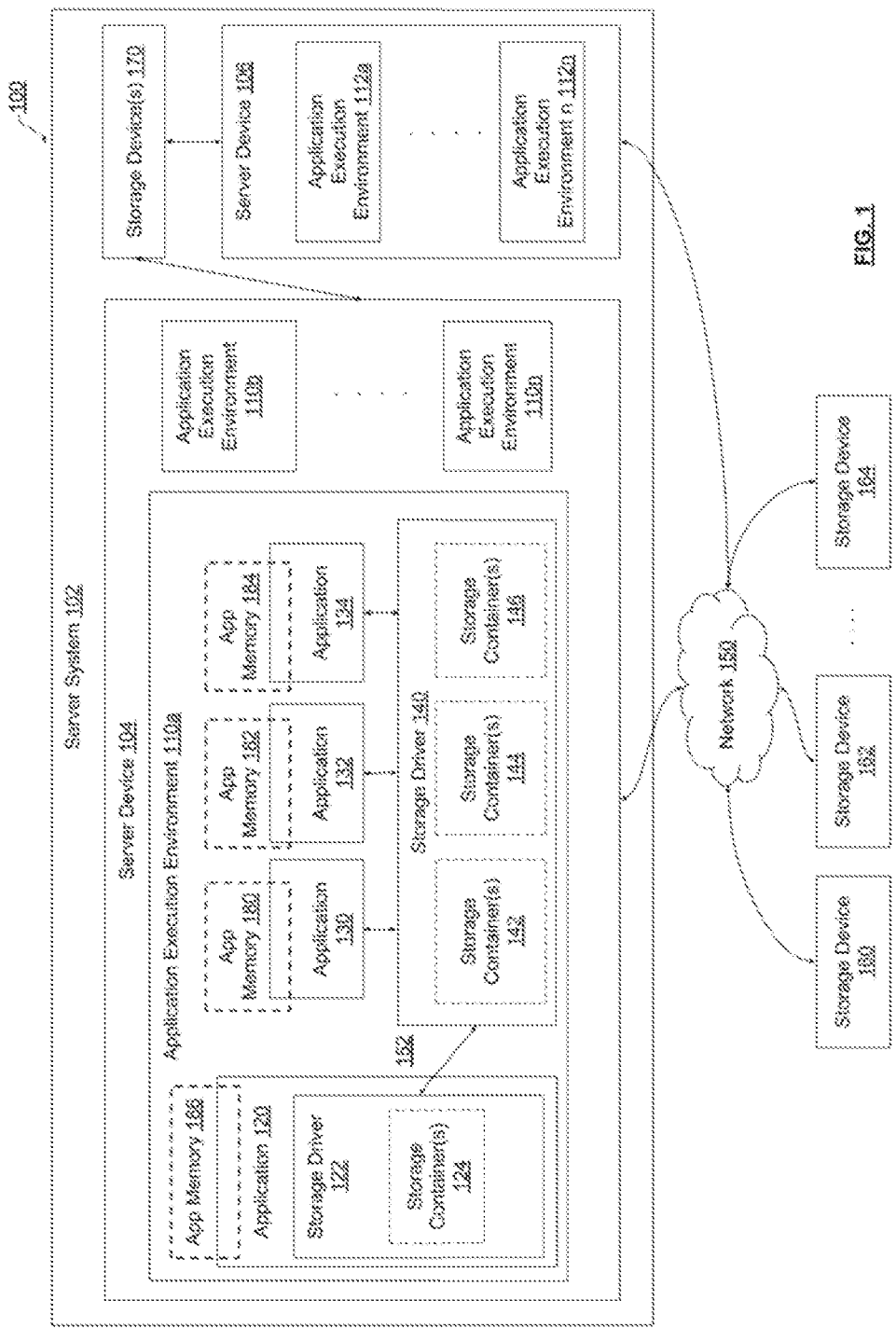
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102. Server system 102 (and other server systems in network environment 100) can communicate with each other, with one or more direct attached storage devices, e.g., storage device(s) 170, networked storage devices 160, 162, and 164, and other systems, e.g., database systems, client devices, storage devices, etc.) over network 150.

Server system 102 can include one or more server devices. For example, server system 102 may be a single server, e.g., with a single main processing board (motherboard) and one or more processors. In another example, server system 102 may include a plurality of servers (e.g., server devices 104 and 106), e.g., arranged in a server rack, in multiple server racks in a data center, in multiple data centers, etc. In this example, each server in the plurality of servers is configured to communicate with other servers via various mechanisms, e.g. over network 150.

A server device (e.g., server device 104, 106) in a server system may be configured to provide one or more application execution environments, e.g., software environments for execution of one or more software applications. A server device may include hardware that supports execution of software applications, e.g., one or more processors (e.g. CPU, GPU, ASIC, FPGA, etc.), memory (including volatile memory, e.g., DRAM, and/or non-volatile memory, e. g., hard disk, flash memory, 3D XPoint™, etc.), network interface, and other hardware.

For ease of illustration, FIG. 1 shows one block for server system 102 that includes two server devices 104 and 106. Server blocks 102, 104, and 106 may represent multiple systems, server devices, and other network devices, and the blocks can be provided in different configurations than shown. For example, server system 102 can represent multiple server devices that can communicate with other server systems via the network 150. In some implementations, server system 102 can include cloud hosting servers, for example. In some examples, storage devices 160-164 can be provided in server system block(s) that are separate from server device 104 and can communicate with server device 104 and other server systems via network 150. In some implementations, network environment 100 may not have all of the components shown and/or may have other elements including other types of elements instead of, or in addition to, those described herein.

Network-attached storage devices 160, 162, and 164, and direct attached storage device 170 may be any type of storage devices, e.g., that provide long-term and/or short-term data storage. For example, storage devices 160-164 may include volatile memory (e.g., DRAM, SRAM, etc.) and/or non-volatile memory (e.g., NVRAM, MRAM, Flash Memory, hard disk drives, phase change memory, 3D Xpoint™, resistive RAM, etc. In some implementations, e.g., in the example illustrated in FIG. 1, storage devices 160-164 are coupled to server system 102 via network 150, e.g., as a storage area network (SAN), as network attached storage (NAS), etc.

In some implementations, e.g., in the example illustrated in FIG. 1, storage device(s) 170 may be coupled to server device 104 and/or server device 106 via direct attached storage protocols, e.g., NVMe, SAS, etc. Storage device(s) 170 can include a plurality of storage devices, e.g., solid-state disks, hard drives, etc. In some implementations, a storage device of storage device(s) 170 may be coupled to one of server device 104 or server device 106. In some implementations, a storage device of storage device(s) 170 may be coupled to both server devices. In some implementations, both direct attached and/or network-attached storage devices may be used. In some implementations, storage devices may be directly coupled to or be a part of server system 102, e.g., coupled to one or more of server devices 104 and 106 via a direct connection (e.g., via PCI bus, USB, etc.). In some implementations, storage devices may include any number of storage devices directly coupled to server system 102, and one or more devices coupled to server system 102 via network 150.

In some implementations, storage devices 160-164 and/or storage device 170 may be solid-state storage devices, e.g., that utilize flash memory or other solid-state data storage technology. In some implementations, a storage device may include a plurality of channels. Each channel may be configured with a plurality of storage chips that can store blocks of data, organized into pages. In some implementations, the plurality of channels may be configured such that only a subset of chips (e.g., a single chip) within a channel can be accessed at a particular instant and other chips are not accessible at the particular instant, e.g., in a serial access configuration. Further, in these implementations, the plurality of channels may be configured to enable concurrent access, e.g., any number of channels (e.g., a subset of the channels, all channels, etc.) may be accessed at any particular instant, e.g., in a parallel access configuration. In some implementations, a storage device may include a storage controller (e.g., a special purpose microprocessor) that facilitates access to the storage device.

Network 150 may be any type of network that enables various systems to exchange data. Network 150 can be any type of communication network, including one or more of the Internet, local area networks (LAN), wireless networks (e.g., 802.11 networks, Bluetooth®, etc.), switch or hub connections, etc. In some implementations, network 130 can include peer-to-peer communication between devices, e.g., using peer-to-peer wireless protocols (e.g., Bluetooth®, Wi-Fi Direct®, etc.), etc. In some implementations, network 150 may include a wired network, e.g., a gigabit Ethernet network and/or a wireless network, e.g., a 802.11 network, a ZigBee® network, etc.

In the example illustrated in FIG. 1, server device 104 is illustrated as providing a first plurality of application execution environment 110a-110n (referred to individually as 110a, 110b, . . . , 110n, and collectively as 110), and server device 106 is illustrated as providing a second plurality of application execution environments 112a-112n (referred to individually as 112a, 112b, . . . , 112n, and collectively as 112). A server device may provide any number of application execution environments, e.g., one application execution environment, or two or more application execution environments. For example, the number of application execution environments provided by a server device may be based on a number and type of software applications to be executed within the application execution environments on the server device, hardware configuration of the server device, connectivity of the server device to other devices, network bandwidth available to the server device, etc.

An application execution environment as described herein can be any software environment that supports execution of a software application. For example, an application execution environment may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based off Linux CGroups, Docker, CoreOS, or the like), a process executing under an operating system (e.g., a UNIX process), etc. In some implementations, the application execution environment may be a software application, e.g., that is configured to execute on server hardware.

Each application execution environment may be configured to support execution of any number of software applications. For example, application execution environment 110a is illustrated as having a plurality of applications (120, 130, 132, and 134) executing within the application execution environment. Each of the plurality of applications may have a respective portion of the memory of server device 104 allocated to it, e.g., app memory 180-186, as illustrated in FIG. 1.

In some implementations, a portion of the memory allocated to an application may be shared between the application and the application execution environment 110a. In these implementations, both the application and the application execution environment are configured to access the memory, e.g., to read or write data. These implementations may provide a benefit that data accessed from a storage device can be written directly into application memory, without having to perform a context switch between the application and application execution environment. Further, applications may be able to access storage hardware directly, without the context switch. In some implementations, the application memory is reserved for use by the application and is not shared with the application execution environment As illustrated in FIG. 1, application 120 includes a storage driver (122) that stores data regarding storage (124) allocated to the application, per techniques of this disclosure. In this example, storage driver 122 is part of application 120 itself, and is not provided separately within the application execution environment. Storage driver 122 is configured to provide application 120 access to storage devices coupled to server device 104.

Further, other applications (130, 132, 134) are illustrated as accessing a storage driver (140) provided within application execution environment 110a. Storage driver 140 may be a software application that is configured to provide other applications within an application execution environment access to one or more storage devices coupled to server device 104, e.g., storage device(s) 170 coupled to server device 104 as direct-attached storage devices and/or any of storage devices 160-164.

In some implementations, storage drivers for various applications, e.g., storage driver 122 included in application 120 and storage driver 140 that provides storage for applications 130, 132, and 134, may communicate with each other. In some implementations, the communication between the storage drivers may be in a peer-to-peer manner, e.g., as illustrated in FIG. 1 by peer-to-peer connection 152. In some implementations, e.g., when three or more storage drivers communicate with each other, such communication may be performed using a mesh connection between the storage drivers (e.g., a software-defined mesh).

For example, storage driver 122 and storage driver 140 may send control plane messages to each other, e.g., to arbitrate access to storage devices. For example, if three applications issue storage access commands, each storage command may correspond to one or more storage devices that are part of a storage container allocated for each respective application. In a mesh configuration, where a respective storage driver for each application communicates with storage drivers for other applications, control plane messages may be used by each storage driver to avoid conflict in accessing the physical storage device. Similar communications may be handled in a peer-to-peer manner between storage drivers of any pair of applications. In both the above examples, the storage driver communicates directly with the storage device, while using communication with other storage drivers for control plane signaling messages.

In some implementations, a centralized master, e.g., implemented in any of the storage drivers (e.g., storage driver 122 or storage driver 140) or as part of an operating system (e.g., part of boot-up configuration) of a server device that provides the applications, may be configured such that it is responsible for storage container configuration. In this example, the centralized master may receive control plane messages, and provide instructions to each storage driver to access a storage device in a manner that eliminates conflict between different storage drivers.

In some implementations, storage driver 122 may store information regarding storage (e.g., non-volatile storage) configured for use by application 120. In the example illustrated in FIG. 1, storage driver 122 stores information for a storage container 124 configured for application 120. Similarly, storage driver 140 may store information regarding storage configured for access by each respective application, e.g., storage container(s) 142 corresponding to application 130, storage container(s) 144 corresponding to application 132, and storage container(s) 146 corresponding to application 134.

In some implementations, information for storage containers 124 and/or storage containers 142, 144, and 146, may include identification information of one or more storage devices (e.g., storage devices 160, 162, and 164) that store data for a corresponding application. For example, data for application 130 may be stored in a plurality of storage devices, and information regarding individual storage units (e.g., memory cells, pages, blocks, chips, etc.) that stored data for application 130 may be accessible from storage container 142. As used herein, storage container refers to a software-defined aggregation of storage units that may be part of an individual storage device (e.g., an SSD drive) or may be spread across multiple storage devices.

Figure 2:
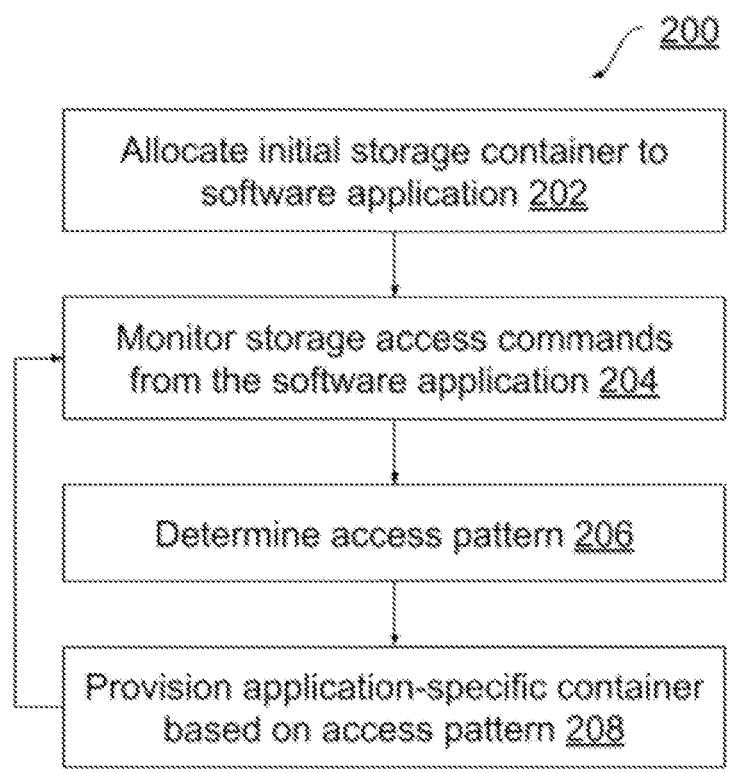
FIG. 2 is a flow diagram illustrating one example of a method 200 to allocate storage to different applications, according to some implementations described herein.

FIG. 2 is a flow diagram illustrating one example of a method 200 to allocate storage to different applications, according to some implementations. In some implementations, method 200 can be implemented, for example, on a server system 102 as shown in FIG. 1. In described examples, the implementing system includes one or more digital processors or processing circuitry ("processors"), and one or more storage devices (e.g., storage devices 160-164 and storage device(s) 170). In some implementations, different components of one or more servers can perform different blocks or other parts of the method 200. In some examples, a first device is described as performing blocks of method 200. Some implementations can have one or more blocks of method 200 performed by one or more other devices (e.g., other server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application being initiated, an application entering a different phase of operation (e.g., with different input-output characteristics), a predetermined time period having expired since the last performance of method 200, and/or one or more other conditions occurring which can be specified in settings for the method. In some implementations, such conditions can be specified, e.g., by a user, a system administrator, an application provider, etc. in stored custom preferences.

In one example, the first device can be a server device, e.g., server device 104, and can perform the method 200. In another example, another server device, e.g., server device 106, can perform the method 200. In yet another example, a different server device, e.g., dedicated or configured for storage management, may implement the method 200. Some implementations can initiate method 200 based on user input. A user, e.g., operator or end-user, may, for example, have selected the initiation of the method 200 from a displayed user interface, e.g., application user interface or other user interface.

In block 202 of method 200, it is determined that an application, e.g., a software application executing on a server device, has been initiated, e.g., launched for the first time, changed from a sleeping state to an operative state, restarted, etc. A software application as referred to herein can be an application execution environment, a server software application such as a database, a web server, an application server, an operating system, a middleware application, a distributed software application, an operating system process (e.g., a process in UNIX), a thread in the user or kernel stack, etc.

In some implementations, storage characteristics and/or requirements for the software application are determined in block 202. Storage characteristics and/or requirements may include, for example, a type of storage (e.g., volatile vs. non-volatile, direct attached vs. network-based, etc.), reliability of the storage, cost per unit of data (e.g., megabyte, gigabyte, etc.), location of the storage devices (e.g., centralized in a single server, centralized at a single data center, distributed across geographically separate data centers, etc.). Storage characteristics and/or requirements may further include bandwidth requirements (e.g., gigabits per second for various operations such as read, erase, write, etc.) and/or capacity requirements (e.g., in gigabytes), etc.

In some implementations, the software application may specify the storage characteristics and/or requirements, e.g., as part of configuration information of the application. In some implementations, storage characteristics and/or requirements may be determined in implementing block 202. For example, storage characteristics and/or requirements may be determined based on a type of the software application.

For example, transactional databases, e.g., that handle online transaction processing (OLTP) queries, may generate a data access pattern that requires relatively high bandwidth for input/output (I/O) operations (referred to as storage bandwidth) and relatively less storage space. In another example, analytical databases that handle online analytical processing (OLAP) queries may generate a data access pattern that require a large amount of sequential I/O but consume significant amounts of storage space on storage devices. In another example, object stores that are used to store different types of data objects generate a data access pattern that requires relatively high I/O bandwidth and often, large storage space. Different applications may generate different data access patterns with reference to quantity of storage used and bandwidth of storage access required to support the application. Further, some applications may require relatively deterministic access to storage devices (e.g., guaranteed access time for access to a storage device) while other applications may be more tolerant of variation in access time.

Further to the examples above, each type of application may be further classified based on the type of I/O operations it performs on the storage, e.g., random I/O operations, sequential I/O operations, etc. For example, an OLTP database may generate relatively more random I/O requests than an OLAP database. A traditional database that supports the structured query language (SQL) and meets ACID constraints (atomicity, consistency, isolation, and durability) may need more random I/O than a different database such as a NoSQL-style database that relaxes one or more of these constraints. Further, different applications may generate different data access patterns during different phases of execution. For example, object stores and OLAP databases may require a large amount of storage bandwidth when the operations performed by these applications are read or create operations, while a relatively less amount of storage bandwidth is necessary for update or delete operations.

In another example, a multi-threaded software application may be determined as requiring temporary storage (e.g., DRAM) with low latency and high bandwidth that enables storage to be accessed in parallel by the multiple threads of the multi-threaded software application. In another example, a backup application may be determined as requiring high storage capacity, sequential I/O, and relatively low (or variable) storage bandwidth. Depending on the type of application, any combination of storage requirements and characteristics may be determined. In some implementations, e.g., when the storage characteristics and/or requirements of a software application are unknown (e.g., not available via configuration settings of the application, cannot be determined based on application type, etc.), default storage characteristics may be utilized.

In addition to storage bandwidth (referring to a number of storage commands issued by the application within a particular time interval), type of I/O (e.g., random or sequential), and storage capacity (e.g., 100 GB, 1 TB, etc.) utilized by the application, another factor may be the size of storage accessed during each command issued by the application. For example, different applications that have similar characteristics with respect to storage bandwidth, type of I/O, and storage space requirements, may issue storage commands that access different size of storage in each command, e.g., 1K, 2K, 4K, etc. Applications that access smaller storage sizes may be associated with a higher number of storage commands to access the same amount of storage space, and container allocation may be performed based on this factor. Container allocation may also be based on a distribution of storage commands issued by an application, e.g., a distribution of create, read, update, and delete operations.

Based on the storage characteristics and requirements, an initial storage container may be allocated to the software application. A storage container, as referred to herein, identifies one or more storage devices (e.g., one or more of storage devices 160-164) that may be allocated partially or entirely, to store data for the software application. For example, a storage container may be a data structure that identifies the storage devices allocated to the software application. Further, in some implementations, the storage container further identifies storage units within a storage device, e.g., memory cells, pages, blocks, storage chips, channels, etc. that are allocated to the software application. Any type of data structure, e.g., a database record, a text file, a distributed data structure across storage devices, etc., can be used to store information indicative of the storage devices (and units with the storage devices) allocated to a software application.

For example, such information (also referred to as container metadata or container definition) may be stored across multiple storage devices, e.g., in a storage container specifically configured for storage of the information in a distributed manner. The storage of such information is performed in a manner that provides redundancy, e.g., if one or more of the storage devices become unavailable, container metadata remains available from the available storage devices. In some implementations, container metadata may be stored in a redundant manner on each of the available storage devices such that any individual device can be accessed to retrieve the container metadata. Distributed storage container metadata is performed such that such metadata can be accessed quickly, and read into memory, e.g., of a server device.

In some implementations, container metadata is stored across all storage devices within the system, e.g., in an N-way replicated manner, such that the container metadata is stored on at least one chip in one channel of each storage device in server system 102. In this implementation, when a new storage device is added, container metadata is atomically replicated to the new storage device.

In some implementations, discrepancies in container metadata across multiple devices, e.g., that may occur due to failure in achieving atomicity in updates across storage devices, are resolved using timestamps associated with such metadata by periodic or as-needed resynchronization of the metadata with that stored in other storage devices. In some implementations, the resynchronization can be further optimized by triggering the resynchronization specifically upon a detected failure in achieving atomicity. In these implementations, resynchronization is turned off once different copies of the container metadata are detected to match. Selective synchronization may be performed by utilizing, e.g., a state machine that has "synchronized" and "unsynchronized" states.

Updating of container metadata may be performed on any individual copy of the container metadata. For example, if container metadata is duplicated on three storage devices with a server system (e.g., server system 102), and storage units allocated to a particular software application are updated, any single copy of the container metadata may be updated to reflect the change. A consensus algorithm (or similar) may be utilized to update other copies of the container metadata. Further, container metadata is stored such that each copy indicates storage units that have been allocated and storage units that are not allocated to any software application. Container metadata is stored in a resilient manner and persistence of this data is ensured.

Container metadata can include data that specifies container configurations within a single computer, e.g., any of server devices 104 or 106. Container metadata is first generated at the time a container is provisioned for an application (e.g., at an initial launch of the application using a default configuration or a template configuration). The metadata is updated when container reconfiguration is performed for a software application. For example, container reconfiguration may be performed periodically at certain intervals (e.g., based on monitoring data access patterns and performing adjustments) or dynamically, e.g., based on a machine-learning model or other pattern recognition technique detecting a change in the data access pattern of the software application. Further, container reconfiguration may also be performed based on dynamic characteristics of storage hardware.

In some implementations, container metadata may also include data that is descriptive of filesystem information, e.g., blocks allocated, blocks bad, blocks free, within a single container. In these implementations, resiliency of container metadata can be set up within an individual storage device or across storage devices within a single server device (e.g., server device 104 or 106) and not across an entire server system (e.g., server system 102). The filesystem information in the container metadata can be stored such that it is updated periodically, e.g., at instances when the stored data is updated (C/U/D of storage blocks/pages/bytes/bits within the storage container) and/or based on a heuristic, e.g., when a particular number of updates are completed, when a threshold percentage of storage units within a storage container are dirty (e.g., contain inaccurate data or outdated copies of data), etc.

In some implementations, the storage container may also store information regarding access configuration for the storage devices, e.g., network address(es) for storage accessed over a network, ports or device address(es) for storage accessed via a port or bus of a server device (e.g., USB, PCI, etc.)

In some implementations, when a storage device (or a portion of a storage device) is allocated to a storage container for a software application, the particular storage units identified in the storage container are reserved for use by the software application, e.g., made unavailable to other software applications. In these implementations, while a storage device may be part of multiple different storage containers, individual units within a storage device are part of a single storage container at any particular instant. These implementations may enable software applications to have a reliable (or deterministic) speed of access to storage, e.g., since the individual storage units are exclusive to the application, and not multiplexed between applications.

Based on software applications executing the environment, storage units or storage devices, may be allocated to particular storage containers and/or deallocated (e.g., removed) from particular storage containers. In these implementations, individual storage units within a storage device are reserved for particular software applications ("shared nothing") while the storage device itself is shared between multiple software applications. In these implementations, multiple applications can access the same storage device with no conflict when accessing individual storage units.

In some implementations, when a storage device (or a portion of a storage device) is allocated to a storage container for a software application, the particular storage units identified in the storage container are configured such that one application (e.g., a writer application) is provided with access to write to the storage units and one or more other applications are provided with read-only access to the storage units. In these implementations, individual storage units within a storage device can be part of multiple storage containers at any particular instant. In these implementations, a writer application can write data to storage that may simultaneously be accessed by one or more reader applications. Each of the writer application and one or more reader applications may have a respective storage container configuration, and individual storage units may be shared (e.g., enabled for access) between multiple applications.

These implementations provide multiple applications access to data, without the overhead to make copies of such data and manage synchronization between multiple copies. For example, the writer application may update data values even as reader application(s) read from storage devices. Container allocation to the different applications is performed in a manner that optimizes access to storage devices based on data access patterns of the writer application and those of the individual reader applications. In these implementations, individual storage units are not exclusive to the application, and in some instances, applications may experience a non-deterministic speed of access to storage. While the foregoing discussion refers to multiple applications, similar allocation of containers may be made for a multi-threaded application that has one or more writer threads, and one or more reader threads, based on data access patterns generated by individual threads. In some implementations, such container configuration may have little to no impact on speed of access, e.g., if the application code generates accesses in a manner that is mutually exclusive between the multiple threads.

The initial storage container allocated to a software application may include storage units/devices that are selected based on the storage characteristics and/or requirements identified for the software application. In some implementations, e.g., when the software application is re-launched (e.g., restarted), enters a waking state from a suspended state, etc., the initial storage container may include storage units and devices that were previously allocated to the software application. Upon allocation of the storage container, the method proceeds to block 204.

In block 204, storage access commands issued by the software application are monitored. For example, during the course of execution, a software application may issue commands to read data from storage, write data to storage, erase data from storage, etc. In some implementations, monitoring of the storage commands may be performed, e.g., by storage driver 122 or storage driver 140. In some implementations, monitoring may include monitoring each command issued by the software application. In some implementations, monitoring may include monitoring a subset of commands, e.g., a random sample, every nth command, commands issued at particular time points, etc. and not all commands. The method proceeds to block 206.

In block 206, the data access pattern for the software application is determined based on the monitored storage commands (e.g., data access requests). For example, the data access pattern may be determined as a high-bandwidth data access pattern, e.g., when the software application issues multiple storage commands to access (e.g., read or write) the storage device data in parallel. For example, two or more threads of a multi-threaded software application may each issue storage commands at the same time, to access the storage device. In another example, a distributed application, e.g., that executes on a plurality of server devices, may issue storage commands in parallel from two or more of the server devices. In some implementations, the storage commands may also be analyzed to determine the proportion of different types of storage accesses, e.g., whether the access pattern is a read-access pattern (e.g., includes more reads than writes to storage), a write-access pattern (e.g., includes more writes than reads from storage), a mixed pattern (e.g., includes both reads and writes), etc. The pattern may be determined based on a proportion of reads and writes in the storage commands. In some implementations, the size of storage units addressed by a command, e.g., 4K, 32K, 64K, etc. may also be included in the access pattern analysis.

In some implementations, storage accesses (e.g., data access requests) that are writes may be further classified into creates (insertion of new data), updates (changes to currently stored data), and deletes (removal or deletion of data). For example, certain applications such as big data applications may include zero updates, indicating that data that is stored is immutable. In these applications, to update a data value, the data value is written as a new value, while the previously written value is deleted. In some implementations, these applications may avoid read before writes. In the implementations that exclude "update" accesses, data once written to storage is known to be immutable.

In another example, the data access pattern may be determined as a sequential data access pattern, e.g., when the software application issues storage commands sequentially. For example, a single-threaded application may issue storage commands sequentially. In another example, a multi-threaded application with a thread dedicated to storage access may issue storage commands sequentially.

Further, in some implementations, the total amount of storage accessed by the software application, e.g., in a particular time interval (e.g., 0.5 seconds, 1 second, 1 hour, within 5000 CPU cycles, etc.), during a lifetime of operation of the software application, etc. may also be determined based on the monitored storage commands. For example, a high storage application may access a large amount of distinct storage units. In these implementations, software applications that access a relatively high amount of storage may be deemed as applications requiring high storage capacity (high storage applications) while other applications may be deemed as low storage applications. The bandwidth of storage access necessary for an application (e.g., Input-Output operations or TOPS) may also be determined. For example, an application that accesses a relatively small number of storage units, but accesses them repeatedly (e.g., thousands of times in a short time interval) may be deemed as a high bandwidth application, e.g., an application that performs a large number of input-output storage operations.

While the foregoing discussion refers to software applications having different types of storage access patterns, e.g., "low-storage, high-bandwidth," "high-storage, low-bandwidth," etc., it may be understood that a single software application may have different access patterns at different times, e.g., during different phases of execution. For example, a database application may have a low-bandwidth, read access pattern in one phase (e.g., when the database processes a read request, e.g., SQL Select command) and a high-bandwidth, write access pattern in a different phase (e.g., when the database processes a write request, e.g., SQL Insert or Update command). In some databases, e.g., NoSQL or key-value pair databases, no updates may be performed. Updates to data, which may be infrequent, may be performed as insert operations on the database to insert new values.

Data access patterns for a software application may be static, e.g., constant or with low variability, during the execution of the software application, or dynamic, e.g., varying during the lifetime of execution. In some implementations, determining a data access pattern can include determining a rate of request arrival, e.g., a rate at which a software application issues storage commands. For example, a software application that has a high rate of request arrival may require relatively low latency access to storage, while another application that has a relatively lower rate of request arrival may tolerate higher latency access.

In some implementations, the data access pattern and/or run-time behavior of the hardware may be determined using a pattern-recognition technique. In some implementations, the data access pattern may be determined using a trained machine learning model. The machine learning model may take as input data access pattern of an application (e.g., based on storage commands issued by the application), and output a classification of the data access pattern with a confidence measure. In some implementations, data access pattern metrics may include, e.g., a count and/or a distribution of various storage device operations (e.g., create, read, update, and delete operation), block sizes (e.g., minimum or maximum block size accessed, distribution of block sizes accessed by storage commands, etc.), and a distribution of types of input-output operations on the storage device, e.g., random I/O, sequential I/O, etc. In some implementations, data access patterns may be measured for individual applications and an associated storage container. In some implementations, data access patterns may be measured for a plurality of applications (that together utilize multiple storage containers) within a device cluster, e.g., that can span a server rack, a data center, and/or multiple geographically distributed servers.

In some implementations, other parameters, e.g., runtime metrics of a storage device, such as latency distribution, error distribution, throughput distribution, SMART metrics from storage device, aggregated metrics across different storage containers configured in a server system, etc. may be used in addition to the data access pattern. For example, the machine learning model may be trained to determine whether the data access pattern indicates an application with a high bandwidth requirement, high storage requirement, etc. In this example, the classification of the data access pattern may be utilized to determine and assign a particular storage container configuration to the application. In some implementations, the machine learning model may directly output a storage container configuration based on the access pattern. In some implementations, runtime hardware characteristics may be used as an additional parameter in determining the storage container configuration, e.g., in addition to the access pattern. The method proceeds to block 208.

In block 208, an application-specific storage container is provisioned based on the determined access pattern. In some implementations, provisioning a storage container may include identifying one or more storage devices and storage units within the identified storage devices for use by the software application. In some implementations, provisioning a storage container may include reserving storage units (e.g., memory cells, pages, chips, channels, etc.) within one or more storage devices for use by the software application. Provisioning may be performed, e.g., by updating storage containers in the storage driver that processes storage commands from the application (e.g., storage driver 122 or storage driver 140).

In some implementations, provisioning may be performed in a manner that optimizes storage access for the software application. For example, if it is determined that the software application has a high-bandwidth access patterns, at least one chip from each of a plurality of storage channels of a storage device may be assigned for use by the software application. In this example, other chips within one or more of the plurality of storage channels may be assigned for use by a different software application. Further, if it is determined that the software has storage requirement that exceeds the storage capacity of an individual storage device, a plurality of storage devices may be assigned for use by the application.

Storage devices, e.g., that use flash memory or other solid-state memory, may permit access to multiple channels of a device in parallel. Assigning chips from multiple storage channels may have the benefit that storage commands from the software application may be completed faster, e.g., since the multiple channels can be accessed in parallel. Further, other chips within a channel may be assigned to other software applications that execute concurrently. Such assignment of different chips within a channel to different applications may offer a benefit of statistical multiplexing. For example, if different software applications issue storage commands at different times, assigning different chips within a channel to different applications based on access patterns, can provide better performance than other assignments.

In another example, if it is determined that the software application as a sequential access pattern, a plurality of storage chips (e.g., all chips, a majority of chips, etc.) within one or more channels may be assigned for use by the software application. Assigning chips in this manner may have the benefit that storage commands from the software application with the sequential access pattern are directed to specific channels of a storage device, while other channels of the storage device may remain available for use by other software applications.

In different implementations, storage containers may be configured in a manner that matches the access patterns of a software application. While the foregoing discussion refers to chips and channels within an individual storage device, storage devices that can be accessed in parallel may be assigned to a software application with a high-bandwidth access pattern, e.g., to provide greater bandwidth to the software application.

Upon configuration of the storage container, software applications are enabled to access storage units and storage devices per the storage container, e.g., with storage driver 122, storage driver 140, etc. The method proceeds to block 204, where storage access commands are monitored.

While the foregoing discussion refers to a single software application, storage commands from multiple software applications executing on server system 102 may be monitored to determine access patterns, and storage containers may be provisioned for the multiple software applications based on the determined access patterns. Further, in some implementations, provisioning of storage container to a particular software application may take into account existing storage container configurations for other software applications, e.g., to determine storage devices and storage units within storage devices, that can be provisioned for the particular software application. In some implementations, e.g., if storage containers are configured such that available storage devices cannot be configured to meet storage characteristics and/or requirements of a particular software application, additional storage devices may be brought online (e.g., switched on, coupled, etc.) within server system 102.

In some implementations, container configurations may be periodically updated, e.g., based on access patterns. In some implementations, updation of the configurations may be based on data access patterns and/or dynamic hardware characteristics (e.g., of storage devices accessed by the application) observed during one or more prior time intervals, e.g., latency of access, faults or errors, etc.

While method 200 has been described with reference to various blocks in FIG. 2, it may be understood that techniques described in this disclosure may be performed without performing some of the blocks of FIG. 2. In some implementations, one or more of the blocks illustrated in FIG. 2 may be combined. In various implementations, some of the blocks of method 200 may be performed in parallel or in an order different from that illustrated in FIG. 2.

Figure 3:
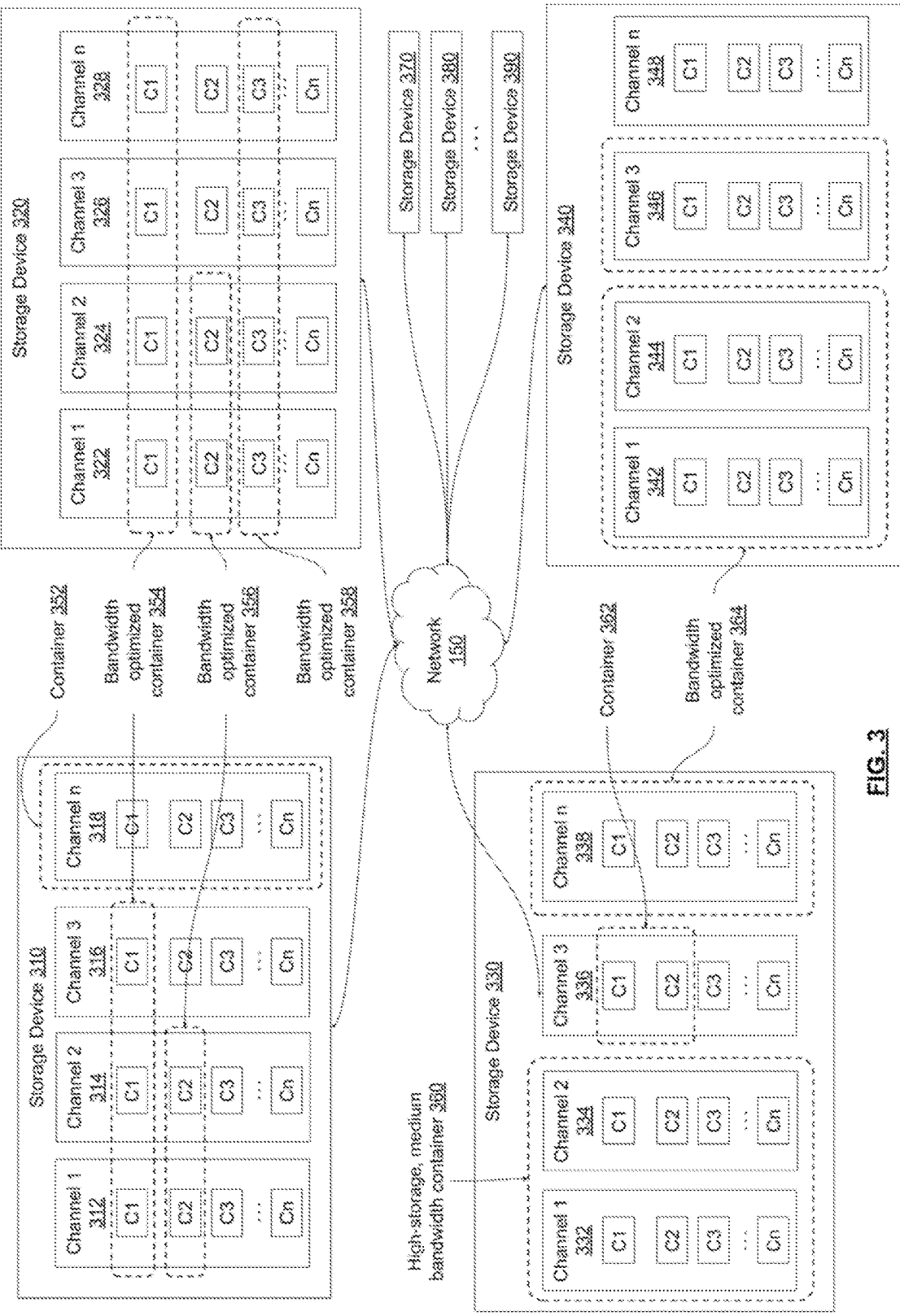
FIG. 3 is a diagrammatic illustration of storage containers allocated to different applications.

FIG. 3 is a diagrammatic illustration of allocation of storage containers to different applications. As illustrated in FIG. 3, storage devices 310-390 are configured in communication with network 150 and are available for use by one or more software applications executing in a network environment. A server system may access any of storage devices 310-390 via network 150 and/or directly, e.g., via a PCI bus.

Each of storage devices 310-390 may be a solid-state storage device, with a plurality of channels and a plurality of storage chips within a channel. For example, storage device 310 includes n channels 312-318, each with respective storage chips $C_1$-$C_n$, storage device 320 includes n channels 322-328, each with respective storage chips $C_1$-$C_n$, storage device 330 includes n channels 332-338, each with respective storage chips $C_1$-$C_n$, and storage device 340 includes n channels 342-348, each with respective storage chips $C_1$-$C_n$.

As illustrated in FIG. 3, different storage containers are provisioned that utilize storage devices 310-340. For example, storage container 352 is configured to use all the chips within a single channel (318) of storage device 310. In another example, storage container 362 utilizes two chips ($C_1$ and $C_2$) from channel 336 of storage device 330. Storage containers 352 and 362 may be suitable, e.g., for a software application that has relatively low storage capacity requirements (e.g., that can be met by total storage capacity of chips within channel 318) and can tolerate relatively higher latency (e.g., has a sequential data access pattern).

In another example, storage container 354 is configured to use three channels of storage device 310 (channels 312, 314, and 316) and utilize a single chip ($C_1$) from each of the channels, and all the channels of storage device 320 (channels 322-328) and utilize a single chip ($C_1$) from each of the channels. Storage container 354 may be a bandwidth optimized container that is suitable for software applications that require low latency (e.g., issue a number of storage commands in parallel). Similarly, other storage containers 356, 358, and 364 are configured to provide high bandwidth access to storage, using different combinations of chips and channels of storage devices 310-340.

In another example, storage container 360 is configured to use all chips ($C_1$-$C_n$) two channels of storage device 330 (channels 332 and 334). Storage container 360 is suitable for software applications that require high storage capacity and medium bandwidth.

While FIG. 3 illustrates a few examples of storage containers, any combination of storage units, e.g., individual memory cells that can store one or more bits of information, memory pages that include a plurality of cells, memory blocks that aggregate a plurality of pages, chips, channels, and entire storage devices may be configured as a storage container, e.g., based on data access patterns of a given software application. In general, a container configuration can include a combination of any type storage units. The smallest size individual unit in a storage container may be selected based on, e.g., the lowest addressable level (e.g., a memory cell, a page, etc.). In some implementations, containers may be defined at a higher level of addressability, e.g., block. In these implementations, while storage may be addressable at a page level, all pages within a single block of storage are assigned to the same storage container.

In some implementations, an initial container configuration may be determined for a software application, e.g., prior to observing an access pattern generated by the application. For example, the initial container configuration may be a default configuration, a template configuration, or a configuration determined based on available storage units. In some implementations, the initial configuration may be chosen from one or more template configurations, e.g., based on one or more factors. For example, such factors may include an identity and/or type of the software application.

The template configurations may be based on different types of workloads. For example, each type of workload may be mapped to a particular template configuration, e.g., based on bandwidth utilized, type of data access, e.g., sequential or random input/output commands, size of data accessed in each command (e.g., 4K, 16K, 64K, 128K, 256K, 512K, etc.), access type (e.g. create, read, update, or delete). For example, for a workload that typically generates large sequential I/O operations, the template configuration may include multiple chips in a single channel of a storage device. The template configuration may be specific to the workload and does not necessarily include details about storage units (e.g., chips, channels, etc.). In some implementations, such details may be discovered dynamically. In another example, for a workload that generates a large number of parallel I/O operations, the template configuration may include at least one chip in a plurality of channels of a storage device, and channels across multiple storage devices. For example, if a software application is multi-threaded and each thread generates read commands in parallel, the number of storage channels in the template configuration may be based on the number of threads. The initial configuration may be a non-optimized configuration that subsequently gets updated after determining the data access patterns generated by the application.

Allocation of storage units in this manner enables providing storage configurations that are workload specific, e.g., matched to the specific access patterns of a given software application, and can deliver improved performance, e.g., than other allocation techniques that do not take the storage access patterns into account and/or do not provision storage container. Further, additional storage devices may be added (e.g., switched on, coupled to server system, etc.) or removed based on data access patterns of software applications that access storage.

There are several technical benefits of allocating storage units and configuring storage containers for software applications. Configuring a storage container to utilize storage chips across multiple channels in a device and multiple storage devices can enable an application to have higher I/O bandwidth available by accessing such storage chips/devices in parallel. Another benefit is that multiple applications can share the same storage devices in a multitenant manner, e.g., by partitioning the device into logical storage containers (e.g., as shown in FIG. 3).

In some implementations, such a configuration allows different applications to access their respective storage units with little or no loss in throughput, e.g., time taken to perform an I/O operation on a storage device, since optimized container configurations can ensure that there is limited or no contention for a physical storage unit between multiple applications. In some implementations, container configurations may also offer hardware level security, e.g., based on data encryption, access control lists, etc. Further, container configurations based on application data access patterns can offer performance guarantees even in the presence of applications that are abusive tenants, e.g., attempt to perform excessive I/O operations. For example, such applications may be subjected to exponential backoff, e.g., storage commands from an application that generates excessive I/O operations (e.g., that don't match container configurations allocated based on data access patterns) may be deprioritized.

Figure 4:
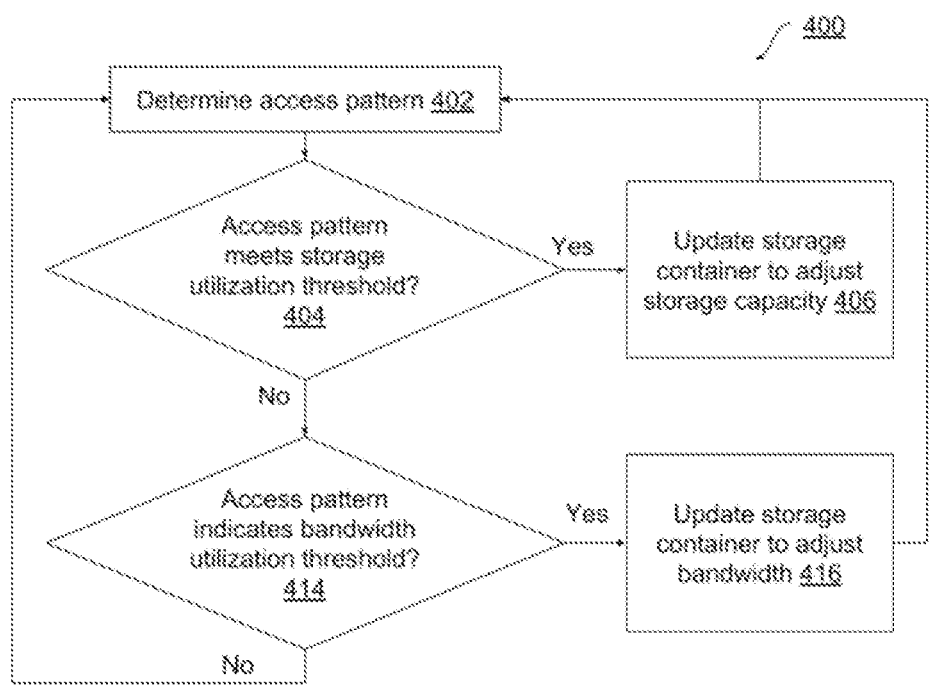
FIG. 4 is a flow diagram illustrating one example of a method 400 to update storage container configuration for a software application, according to some implementations described herein.

FIG. 4 is a flow diagram illustrating one example of a method 400 to update storage container configuration for a software application, according to some implementations. In some implementations, method 400 can be implemented, for example, on a server system 102 as shown in FIG. 1. In described examples, the implementing system includes one or more digital processors or processing circuitry ("processors"), and one or more storage devices (e.g., storage devices 160-164). In some implementations, different components of one or more servers can perform different blocks or other parts of the method 400. In some examples, a first device is described as performing blocks of method 400. Some implementations can have one or more blocks of method 400 performed by one or more other devices (e.g., other server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., an application being initiated, an application entering a different phase of operation (e.g., with different input-output characteristics), a predetermined time period having expired since the last performance of method 200, and/or one or more other conditions occurring which can be specified in settings for the method. In some implementations, such conditions can be specified, e.g., by a user, a system administrator, an application provider, etc. in stored custom preferences.

In one example, the first device can be a server device, e.g., server device 104, and can perform the method 400. In another example, another server device, e.g., server device 106, can perform the method 400. In yet another example, a different server device, e.g., dedicated or configured for storage management, may implement the method 200. Some implementations can initiate method 400 based on user input. A user (e.g., operator or end-user) may, for example, have selected the initiation of the method 400 from a displayed user interface, e.g., application user interface or other user interface.

In block 402 of method 400, the data access pattern of a software application under execution (e.g., on one or more server devices within a server system, e.g., server system 102) is determined. For example, block 402 may be performed periodically during execution of the software application. Analysis of access patterns may be performed in a manner similar to described above with reference to block 206 of method 200. The method proceeds to block 404.

In block 404, it is determined whether the software application (also referred to as workload) access pattern meets one or more storage utilization thresholds. For example, if the access pattern indicates that the software application is consuming storage capacity at a high rate (e.g., due to large number of writes), it may be determined that the access pattern meets an upper storage utilization threshold. In another example, if the access pattern indicates that the software application is consuming storage capacity at a low rate (e.g., due to large number of erases, resulting in empty blocks in the provisioned storage container), it may be determined that the access pattern meets a lower storage utilization threshold. If it is determined that the data access pattern meets the upper storage utilization threshold or the lower storage utilization threshold, the method proceeds to block 406, else the method proceeds to block 412.

In block 406, the storage container for the software application is updated to adjust available storage capacity. For example, updating the storage container may include allocating additional storage units (e.g., storage chips) from a storage device that has available storage capacity, e.g., when the access pattern meets the upper storage utilization threshold. The storage device may include a storage device that is included in the storage container or adding storage units from a different storage device that is currently not included the storage container. In some implementations, one or more storage devices may be brought online (e.g., switched on, connected to network/storage interface, etc.) in response to the access pattern meeting the upper storage utilization threshold. The storage container is updated such that total available storage capacity is increased, e.g., with no or low change in the bandwidth. Similarly, in response to the access pattern meeting the lower storage utilization threshold, one or more storage units or storage devices may be removed from the storage container, e.g., storage units that are currently not used by the software application, used for a small fraction of capacity, etc. The storage container is updated such that total available storage capacity is decreased, e.g., with no or low change in the bandwidth. The method proceeds to block 402.

In block 414, it is determined whether the software application (also referred to as workload) access pattern meets one or more bandwidth utilization thresholds. For example, if the access pattern indicates that the software application is accessing storage units in the storage container at a high rate (e.g., due to large number of parallel reads or writes), it may be determined that the access pattern meets an upper bandwidth utilization threshold. In another example, if the access pattern indicates that the software application is accessing storage units in the storage container at a low rate (e.g., due to smaller size accesses, low overall number of accesses, etc.), it may be determined that the access pattern meets a lower bandwidth utilization threshold. If it is determined that the data access pattern meets the upper bandwidth utilization threshold or the lower bandwidth utilization threshold, the method proceeds to block 416, else the method proceeds to block 402.

In block 416, the storage container for the software application is updated to adjust available bandwidth. For example, updating the storage container may include allocating additional storage units (e.g., storage chips) that can be accessed in parallel with storage units in the current storage container configuration, e.g., when the access pattern meets the upper bandwidth utilization threshold. The additional storage units may include unallocated storage units from a storage device that is included in the storage container, or storage units from a different storage device that is currently not included the storage container. In some implementations, one or more storage devices may be brought online (e.g., switched on, connected to network/storage interface, etc.) in response to the access pattern meeting the upper bandwidth utilization threshold. The storage container is updated such that total available storage bandwidth is increased. Similarly, in response to the access pattern meeting the lower bandwidth utilization threshold, one or more storage units or storage devices may be removed from the storage container. The storage container is updated such that total available bandwidth is decreased. The method proceeds to block 402.

Method 400 can be utilized to adjust storage container configuration based on workload characteristics. For example, as access patterns for a software application change (e.g., due to different execution stages, different code modules being executed, different inputs, etc.), the storage container configuration can be adjusted such that application demands for storage and/or bandwidth are met. Such adjustment also allows storage units to be made available for use by other applications, when determined as not required for a given software application. Dynamic adjustment of the storage container configuration results in available storage capacity being deployed in a manner that reduces requirement of storage hardware and can save costs.

Adjusting container configurations offers several technical benefits. For example, periodic adjustments (e.g., at regular intervals, or at times when data access patterns of a software application exhibit a substantial change) can improve utilization of storage hardware. For example, this can be beneficial for applications that have data access patterns that are cyclical in nature. An application that generates a significant number of high bandwidth, random write operations (e.g., as create, update, or delete operations) during the day may have a different access pattern, e.g., majority sequential I/O operations, at night.

Further, application owners or administrators may not be aware of the data access patterns for an application, and may choose a default or template container configuration, e.g., based on a type of the application. Adjusting container configurations allows over-provisioning storage resources to applications for which data access patterns are not known, and subsequently, modifying the container configuration based on observed data access patterns, potentially reducing the quantity of storage allocated to the application and improving utilization of available storage devices. Further, additional storage resources can be allocated to applications on an as-needed basis.

Figure 5:
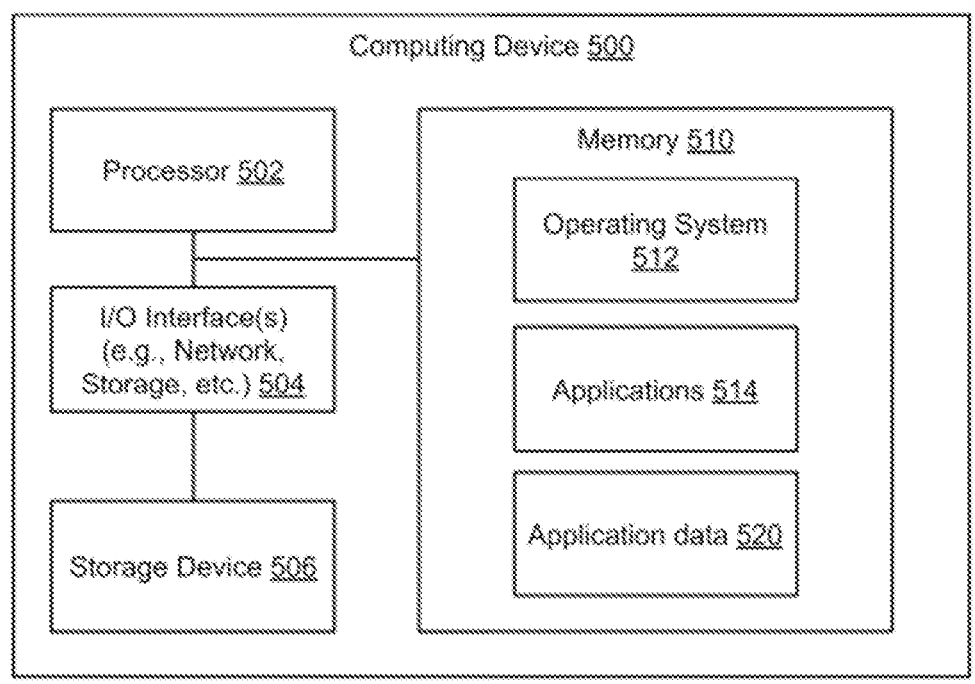
FIG. 5 is a block diagram of an example computing device 500 which may be used to implement one or more features described herein.

FIG. 5 is a block diagram of an example computing device 500 which may be used to implement one or more features described herein. In one example, device 500 may be used to implement a computer device, e.g., a storage optimization device, and perform appropriate method implementations described herein. Device 500 can be any suitable computer system, server, or other electronic or hardware device. For example, the device 500 can be a mainframe computer, server computer, desktop computer, workstation, portable computer, or medical device. In some implementations, device 500 includes a processor 502, input/output (I/O) interface 504, one or more storage devices 506, and a memory 510.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 510 is typically provided in device 500 for access by the processor 502 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 510 can store software operating on the server device 500 by the processor 502, including an operating system 512, one or more applications 514, e.g., a workload optimized storage management application, and application data 520. In some implementations, applications 514 can include instructions that enable processor 502 to perform the functions described herein, e.g., some or all of the methods of FIG. 2 and/or FIG. 4. Memory 510 also stores application data 520, e.g., storage access patterns for one or more of applications 514, that may be used by a workload optimized storage management application to determine allocation of storage units to the one or more applications.

For example, applications 514 can include a workload optimized storage management application, which as described herein can be a workload optimized storage management application that can manage storage (e.g., including storage device 506 and storage devices external to computing device 500), e.g., monitor data access patterns by various applications 514, allocate storage units to different applications, and update allocated storage units. Any of software in memory 510 can alternatively be stored on any other suitable storage location or computer-readable medium. In addition, memory 510 (and/or other connected storage device(s)) can store other instructions and data used in the features described herein. Memory 510 and any other type of storage (magnetic disk, optical disk, magnetic tape, or other tangible media) can be considered "storage" or "storage devices."

In various implementations, applications 514 can include a machine-learning application. The machine-learning application may utilize Bayesian classifiers, support vector machines, neural networks, or other learning techniques. In some implementations, machine-learning application may include a trained model, an inference engine, and data. In some implementations, data may include training data, e.g., data used to generate trained model. For example, training data may include historical data on storage accesses by one or more software applications, corresponding historical allocations of storage units, and performance data regarding performance of storage devices. Training data may be obtained from any source, e.g., a data repository specifically marked for training.

In some implementations, the machine-learning application excludes data. For example, in these implementations, the trained model may be generated, e.g., on a different device, and be provided as part of machine-learning application. In various implementations, the trained model may be provided as a data file that includes a model structure or form, and associated weights. The inference engine may read the data file for a trained model and implement a neural network with node connectivity, layers, and weights based on the model structure or form specified in the trained model.

Machine-learning application also includes a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, storage commands generated by one or more applications, e.g., when the trained model is used for storage management. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be an updated configuration of storage units indicating storage units to be allocated to the applications that generated the storage commands. In some implementations, model form or structure also specifies a number and/or type of nodes in each layer.

In different implementations, trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation may include applying a step/activation function to the adjusted weighted sum. In some implementations, the step/activation function may be a nonlinear function. In various implementations, computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

Machine-learning application also includes an inference engine. The inference engine is configured to apply the trained model to data, such as application data, to provide an inference. In some implementations, the inference engine may include software code to be executed by processor. In some implementations, the inference engine may specify a circuit configuration (e.g., for a programmable processor, for a field programmable gate array (FPGA), etc.) enabling a processor to apply the trained model. In some implementations, the inference engine may include software instructions, hardware instructions, or a combination.

I/O interface 504 can provide functions to enable interfacing the computing device 500 with other systems and devices. For example, network communication devices, external storage devices, and other input/output devices can communicate via interface 504. In some implementations, the I/O interface 504 can connect to interface devices including input devices (keyboard, pointing device, touchscreen, microphone, camera, scanner, etc.) and/or output devices (display device, speaker devices, printer, motor, etc.).

Storage device 506 is one example of a storage device, e.g., a solid-state storage device, a hard disk drive, etc. that can be used by operating system 512 and/or one or more applications 514. Storage device 506 is a direct attached storage device, e.g., coupled to processor 502 and directly controlled by processor 502. Processor 502 is coupled to I/O interface(s) 504, storage device 506, and memory 510 via local connections (e.g., a PCI bus, or other type of local interface) and/or via networked connections.

For ease of illustration, FIG. 5 shows one block for each of processor 502, I/O interface 5046, storage device 506, and memory 510 with software blocks 512, 514, and 520. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. Any suitable component or combination of components of system 102 or similar system, or any suitable processor or processors associated with such a system, may perform the operations described, e.g., with reference to FIGS. 2 and 4.

A user device can also implement and/or be used with features described herein. Example user devices can be computer devices including some similar components as the computing device 500. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 200 and/or method 400) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, or a solid-state memory drive.

The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method to store data in a storage device with a plurality of storage chips, the method comprising:
   identifying a plurality of software applications that are configured to access data from the storage device;
   determining a data access pattern for each of the plurality of software applications; and
   based on the data access pattern, assigning a respective subset of the plurality of storage chips to each software application such that each storage chip is configured for access by a specific software application.

2. The computer-implemented method of claim 1, wherein the plurality of storage chips are organized in channels such that only a subset of storage chips from each channel are accessible concurrently.

3. The computer-implemented method of claim 2, wherein a first software application of the plurality of software applications is determined to have a high-bandwidth data access pattern, and wherein assigning the subset of storage chips for the first software application comprises assigning at least one chip from each of a plurality of channels.

4. The computer-implemented method of claim 2, wherein a first software application of the plurality of software applications is determined to have one or more of a sequential data access pattern or a low-bandwidth data access pattern, and wherein assigning the subset of storage chips for the first software application comprises configuring one or more channels such that each storage chip from the one or more channels is assigned for access by the first software application.

5. The computer-implemented method of claim 1, wherein determining the data access pattern is based on historical data access requests.

6. The computer-implemented method of claim 1, wherein at least one storage chip of the respective subset of the plurality of storage chips for the specific software application is configured for write operations and two or more of the subset of the plurality of storage chips, different from the at least one storage chip, are configured for read operations.

7. The computer-implemented method of claim 1, wherein at least one storage chip of the respective subset of the plurality of storage chips for the specific software application is simultaneously configured for read operations and write operations.

8. The computer-implemented method of claim 1, wherein determining the data access pattern comprises determining a type of request for each data access request and determining a rate of request arrival.

9. The computer-implemented method of claim 1, wherein determining the data access pattern is performed using a pattern-recognition technique.

10. The computer-implemented method of claim 1, wherein determining the data access pattern is based on a type of each of the plurality of software applications.

11. The computer-implemented method of claim 1, further comprising determining dynamic hardware characteristics of the storage device, and wherein assigning the respective subset of the plurality of storage chips is further based on the dynamic hardware characteristics of the storage device.

12. A computer-implemented method to store data in a plurality of storage devices, each storage device configured with a plurality of storage chips arranged in a respective channel, the method comprising:
    identifying a plurality of software applications that are configured to access data from the plurality of storage devices;
    determining a data access pattern for each of the plurality of software applications; and
    based on the data access pattern, assigning a respective subset of the plurality of storage devices to each software application.

13. The computer-implemented method of claim 12, wherein at least one channel in each storage device in the respective subset is configured to include at least one storage chip configured for access by a respective software application.

14. The computer-implemented method of claim 12, wherein a first software application of the plurality of software applications is determined to have a high-bandwidth data access pattern, and wherein assigning the respective subset of the plurality of storage devices to the first software application comprises assigning at least one chip from each of multiple storage devices of the respective subset.

15. The computer-implemented method of claim 12, wherein at least one chip from each storage device of the plurality of storage devices is included in the subset.

16. The computer-implemented method of claim 15, wherein at least one chip from each channel of each storage device of the plurality of storage devices is included in the subset.

17. A non-transitory computer-readable medium with instructions stored thereon that, when executed by one or more processors, cause the one or more processors to perform operations comprising:
    identifying a plurality of software applications that are configured to access data from a storage device that includes a plurality of storage chips;
    determining a data access pattern for each of the plurality of software applications; and
    based on the data access pattern, assigning a respective subset of the plurality of storage chips to each software application such that each storage chip is configured for access by a specific software application.

18. The non-transitory computer-readable medium of claim 17, wherein the plurality of storage chips are arranged in a plurality of channels, wherein a first software application of the plurality of software applications is determined to have a high-bandwidth data access pattern, and wherein assigning the subset of storage chips for the first software application comprises assigning at least one chip from each of the plurality of channels.

19. The non-transitory computer-readable medium of claim 17, wherein the plurality of storage chips are arranged in a plurality of channels, wherein a first software application of the plurality of software applications is determined to have one or more of a sequential data access pattern or a low-bandwidth data access pattern, and wherein assigning the subset of storage chips for the first software application comprises configuring one or more channels such that each storage chip from the one or more channels is assigned for access by the first software application.

20. The non-transitory computer-readable medium of claim 17, wherein determining the data access pattern comprises determining a type of request for each data access request and determining a rate of request arrival.

* * * * *